United States Patent
Manolakos et al.

(10) Patent No.: US 10,999,030 B2
(45) Date of Patent: May 4, 2021

(54) DEMODULATION REFERENCE SIGNAL (DMRS) TIME DOMAIN BUNDLING AND MULTIPLE CODEWORD TRANSMISSION AND PROCESSING

(71) Applicant: QUALCOMM Incorporated, San Diego, CA (US)

(72) Inventors: Alexandros Manolakos, San Diego, CA (US); Gabi Sarkis, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 16/385,507

(22) Filed: Apr. 16, 2019

(65) Prior Publication Data

US 2019/0319757 A1    Oct. 17, 2019

(30) Foreign Application Priority Data

Apr. 17, 2018  (GR) .............................. 20180100165

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0689* (2013.01); *H04L 1/0003* (2013.01); *H04L 1/18* (2013.01); *H04W 72/1205* (2013.01)

(58) Field of Classification Search
CPC ....... H04L 5/0048; H04L 1/0003; H04L 1/18; H04B 7/0689; H04W 72/1205
See application file for complete search history.

(56) References Cited

U.S. PATENT DOCUMENTS

2018/0145809 A1 * 5/2018 Kwak ................... H04L 5/0094

FOREIGN PATENT DOCUMENTS

WO    WO-2016024972 A1 *   2/2016   ........... H04L 1/1607

OTHER PUBLICATIONS

3GPP; 3GPP TSG-RAN WG1 #61 R1-102895; 2010 (Year: 2010).*
(Continued)

*Primary Examiner* — Ricky Q Ngo
*Assistant Examiner* — Stephen N Steiner
(74) *Attorney, Agent, or Firm* — Patterson + Sheridan, LLP

(57) ABSTRACT

Certain aspects of the present disclosure provide techniques for demodulation reference signal (DMRS) time domain bundling and multiple codeword transmission and processing in new radio (NR) systems. A method by a transmitting device includes transmitting multiple codewords to a receiving device in a first period, each of the multiple codewords transmitted using a different set of one or more DMRS ports. The transmitting device determines to retransmit one or more of the multiple codewords and, for each of the multiple codewords to be retransmitted, the set of DMRS ports for retransmission of the codeword. The determination is based, at least in part, on whether DMRS time domain bundling is configured. The transmitting device retransmits the one or more codewords in a second period based on the determination. The receiving device determines the DMRS ports used and processes the retransmitted codewords based on the determination.

20 Claims, 10 Drawing Sheets

(51) Int. Cl.
  *H04W 72/12*   (2009.01)
  *H04L 1/18*    (2006.01)
  *H04L 1/00*    (2006.01)

(56) References Cited

OTHER PUBLICATIONS

3GPP; 3GPP TSG RAN WG1 meeting #61 R1-103096; 2010 (Year: 2010).*

International Search Report and Written Opinion—PCT/US2019/027946—ISA/EPO—dated Jun. 26, 2019.

ZTE: "Views on Layer to DMRS Port Mapping for Retransmission," 3GPP Draft; R1-102895 Views on Layer to DMRS Port Mapping for Retransmission, 3rd Generation Partnership Project (3GPP), vol. RAN WG1, No. Montreal, Canada; May 10, 2010-May 14, 2010, May 4, 2010, XP050598320, 4 pages, [retrieved on May 4, 2010] section 2; figures 1, 2.

* cited by examiner

DEMODULATION REFERENCE SIGNAL (DMRS) TIME DOMAIN BUNDLING AND MULTIPLE CODEWORD TRANSMISSION AND PROCESSING

CLAIM OF PRIORITY UNDER 35 U.S.C. § 119

The present Application for Patent claims benefit of Greece Patent Application Serial No. 20180100165, filed Apr. 17, 2018, assigned to the assignee hereof and hereby expressly incorporated by reference herein.

FIELD OF THE DISCLOSURE

Aspects of the present disclosure relate to wireless communications, and more particularly, to techniques for demodulation reference signal (DMRS) time domain bundling and multiple codeword transmission and processing in wireless communications systems, such as new radio (NR) systems.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure relate to demodulation reference signal (DMRS) time domain bundling and multiple codeword transmission and processing in new radio (NR) systems.

Certain aspects provide a method for wireless communication by a receiving device. The method generally includes receiving multiple codewords from a transmitting device in a first period, each of the multiple codewords transmitted using a different set of one or more DMRS ports. The method includes determining, for one or more the multiple codewords to be retransmitted, the set of DMRS ports used for the retransmitted codeword. The determination is based, at least in part, on whether DMRS time domain bundling is configured. The method includes processing the one or more retransmitted codewords in a second period based on the determination.

Certain aspects provide a method for wireless communication by a transmitting device. The method generally includes transmitting multiple codewords to a receiving device in a first period, each of the multiple codewords transmitted using a different set of one or more DMRS ports. The method includes determining to retransmit one or more of the multiple codewords and, for each of the multiple codewords to be retransmitted, the set of DMRS ports for retransmission of the codeword. The determination is based, at least in part, on whether DMRS time domain bundling is configured. The method includes retransmitting the one or more codewords in a second period based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
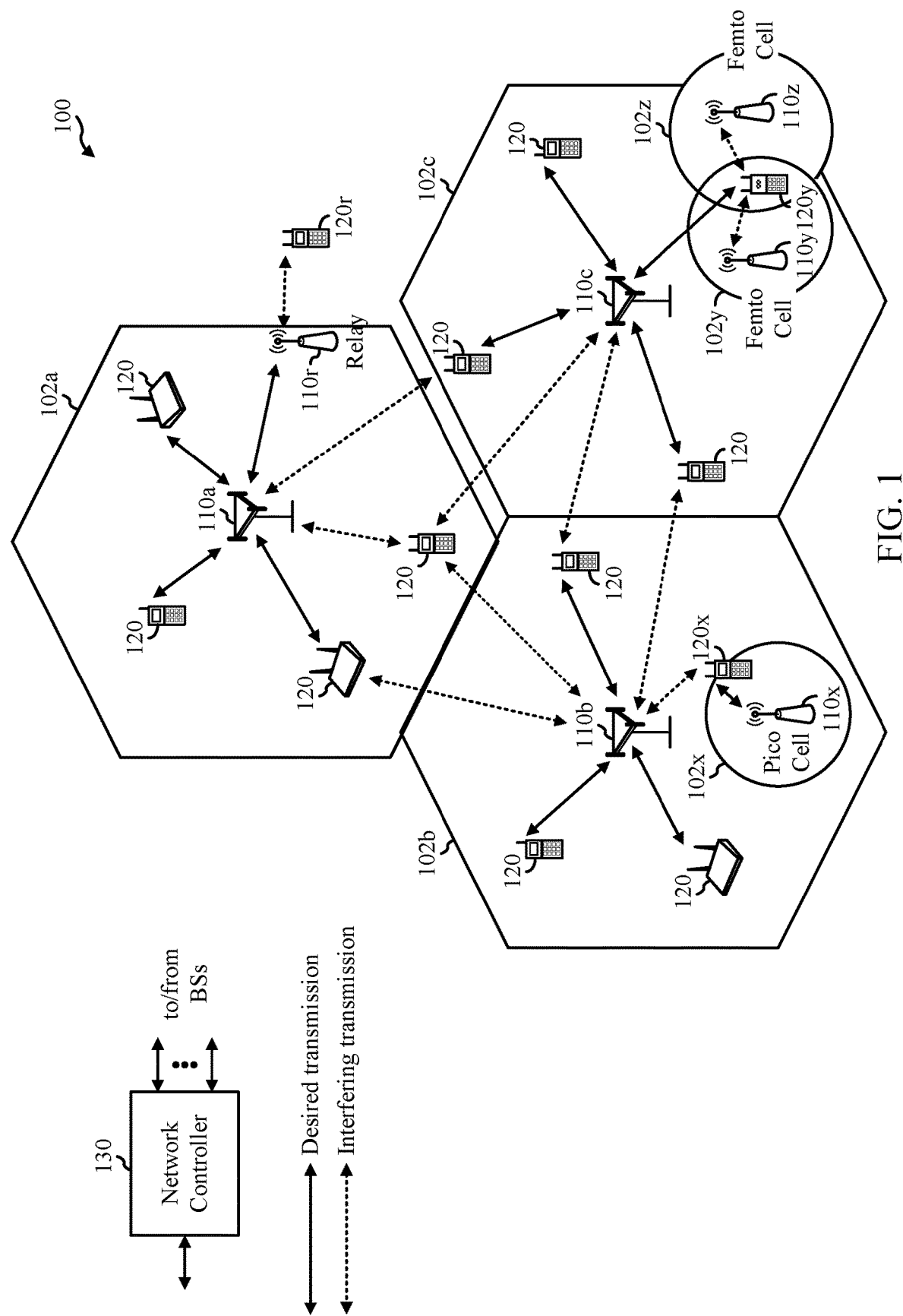
FIG. 1 is a block diagram conceptually illustrating an example telecommunications system, in accordance with certain aspects of the present disclosure.

Aspects of the present disclosure provide apparatus, methods, processing systems, and computer readable mediums for demodulation reference signal (DMRS) time domain bundling and multiple codeword transmission and processing in wireless communications systems, such as new radio (NR) systems.

DMRS ports used for transmission of codewords may be quasi collocated. The quasi-collocated DMRS ports share a set of quasi collocation (QCL) parameters. DMRS generally refers to a special type of physical layer signal which functions as a reference signal for decoding a channel transmitted therewith (e.g., PUSCH on the uplink or PDSCH on the downlink). A DMRS port (or DMRS antenna port) generally refers to a generic term for signal transmission under identical channel conditions (e.g., transmission via a same physical or virtual antennas).

QCL generally refers to a set of assumptions that two entities that are quasi collocated (or QCL'd) experience substantially the same channel conditions, at least with respect to the particular QCL parameters. For example, if two reference signals are considered QCL'd, measurements taken based on one of the reference signals (e.g., for channel estimation purposes) may be substituted for the other.

Different groups of DMRS ports can share different set of QCL parameters. The data of the codewords is mapped to DMRS pots for transmission. With DMRS time domain bundling, the receiver can assume that the same precoder is used for the same data channel a different times.

Aspects of the present disclosure provide techniques and apparatus for mapping of codewords to DMRS for transmissions and retransmissions when DMRS time domain bundling is configured and not configured and codewords are mapped to DMRS ports in different QCL groups.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 and base stations 110 may transmit and process codewords, in accordance with operations of FIGS. 7 and 8 described below.

The wireless communication network 100 may be a New Radio (NR) or 5G network. A transmitting device, such as a user equipment (UE 120) on the uplink or a base station (BS) 110 on the downlink can transmit multiple codewords. The transmitting device determines demodulation reference signal (DMRS) ports for the transmission and can determine different DMRS ports for retransmissions. The receiving device, such as a UE 120 on the downlink or a BS 110 on the uplink, can determine the DMRS ports used for transmission and retransmission of codewords and processes the codewords based on the determination.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
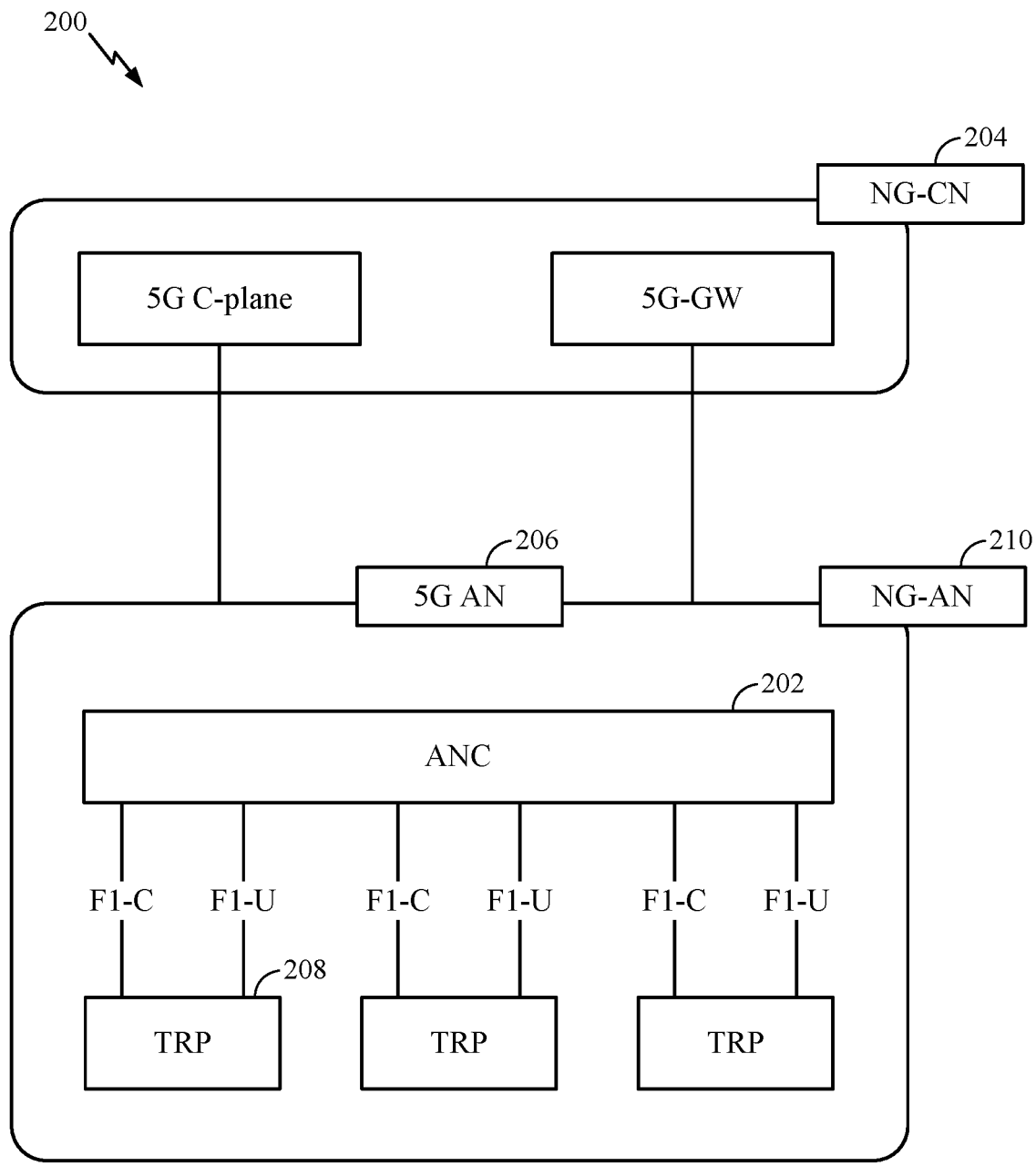
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an ANC 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
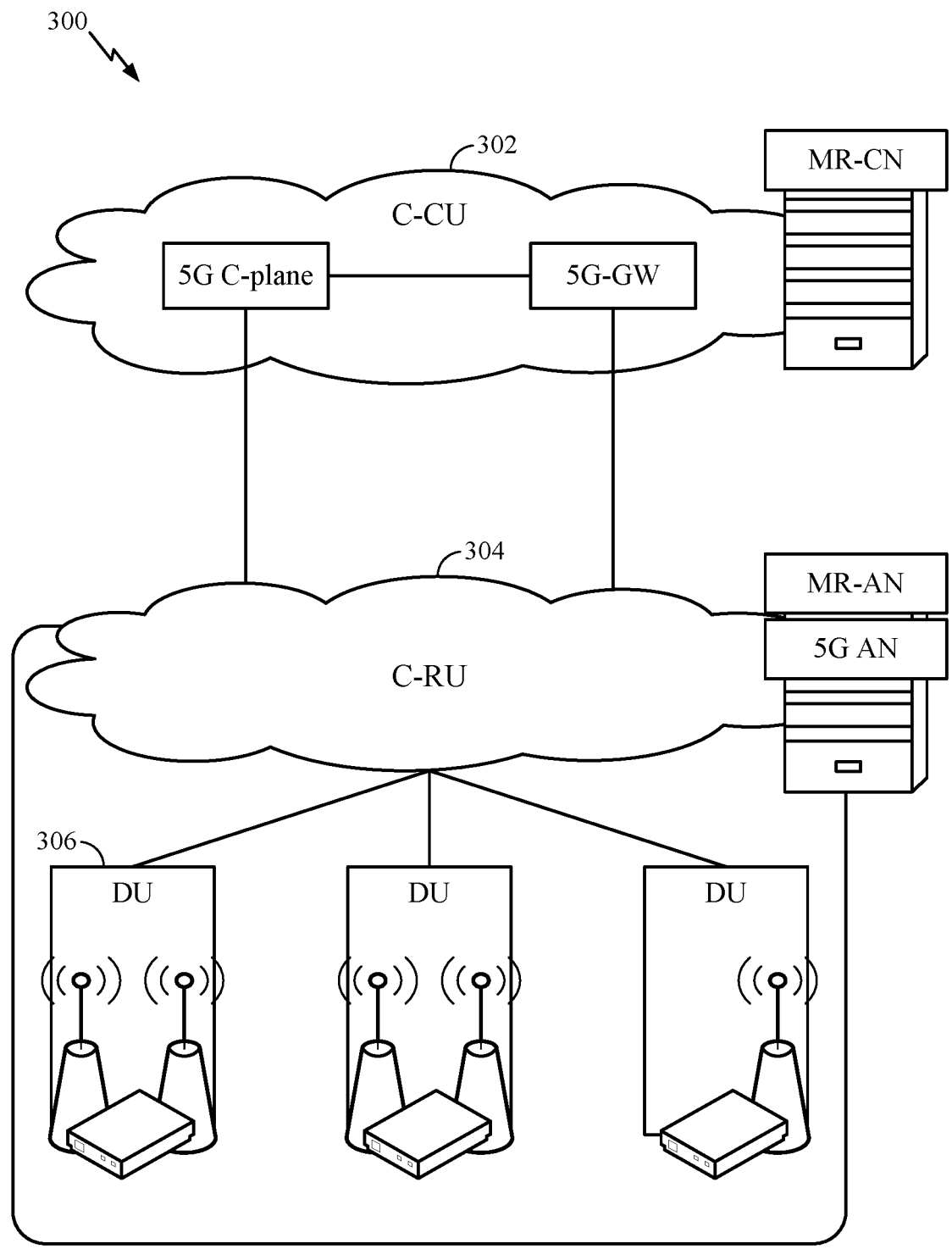
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
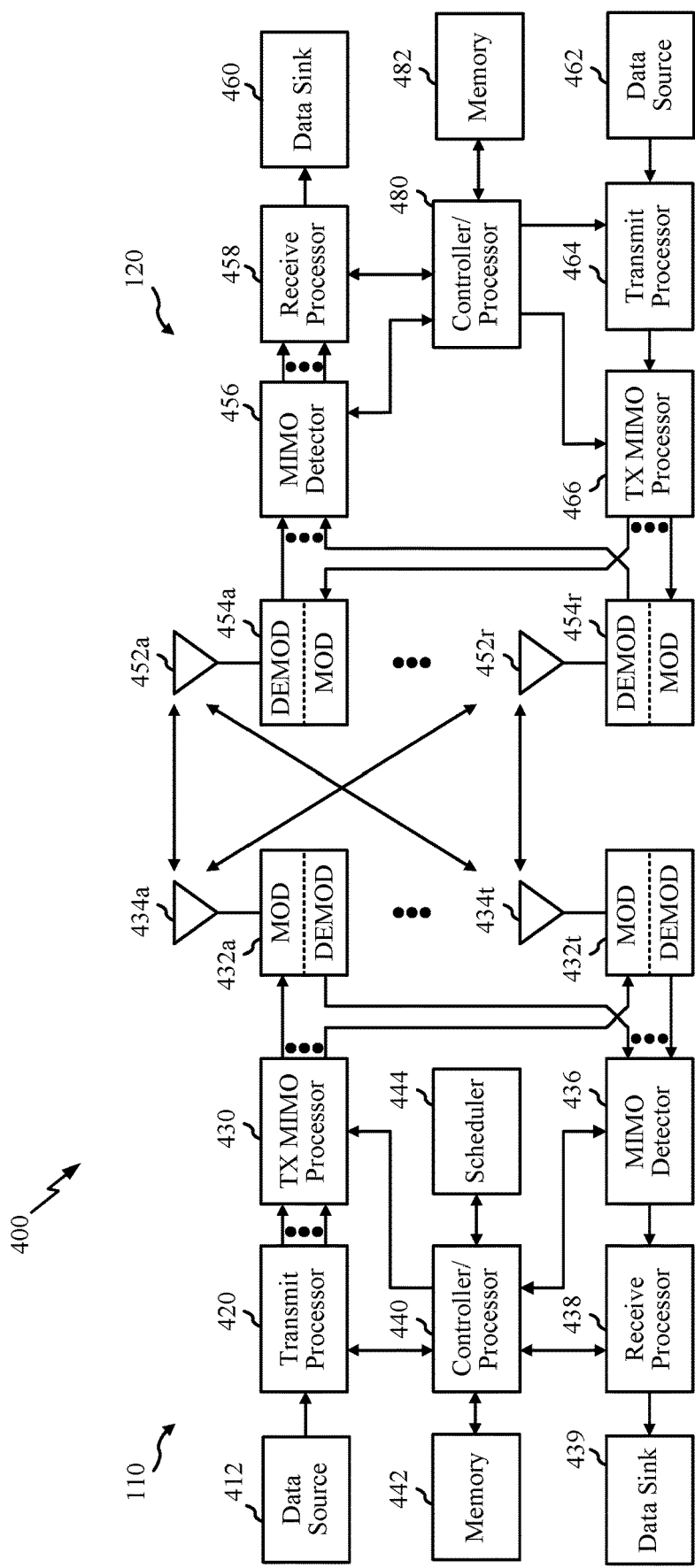
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein for DMRS time domain bundling and multiple codeword transmission and processing.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
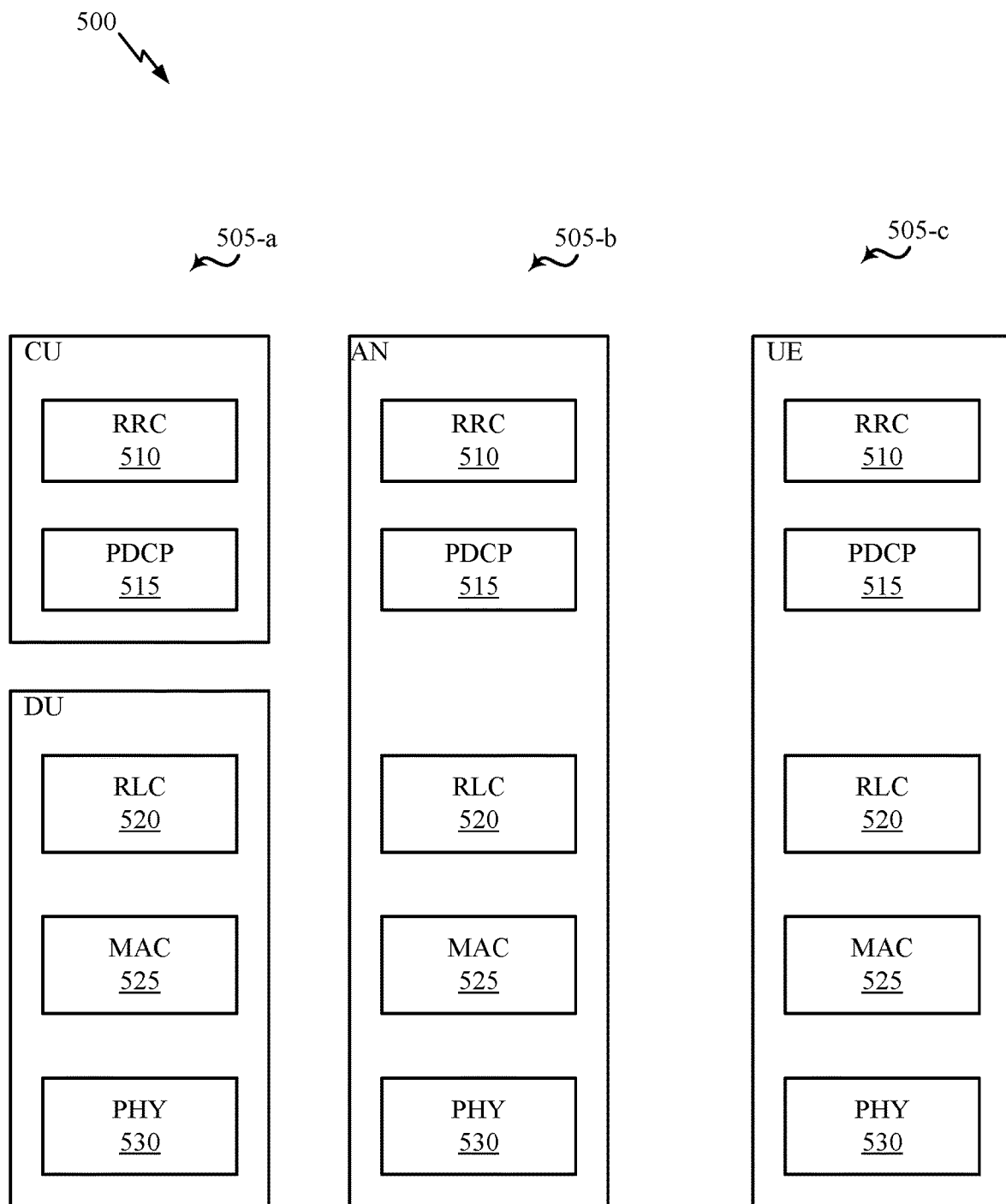
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
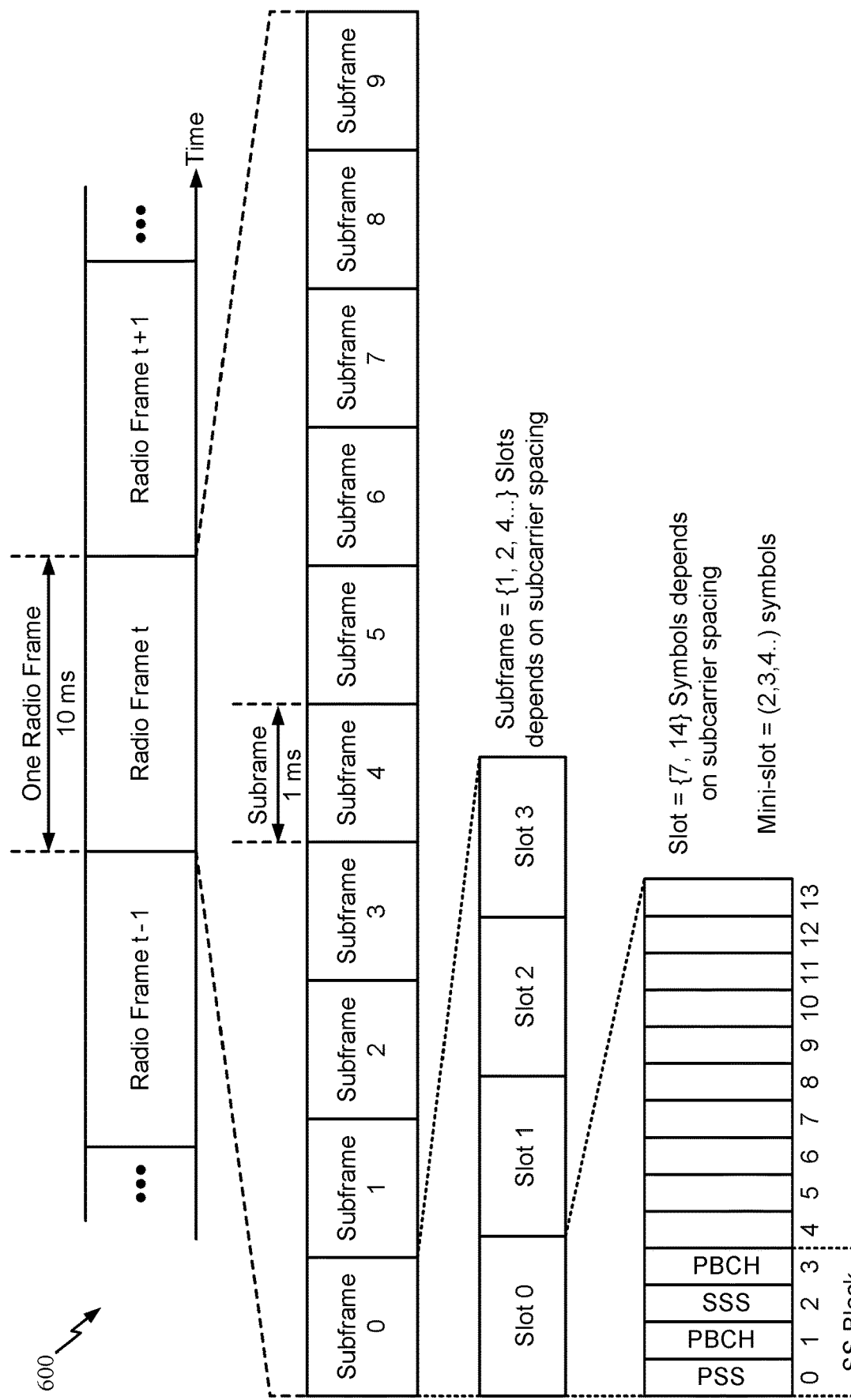
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot generally refers to a subslot structure that is less than one slot in duration (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information (SI), such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example DMRS Time Domain Bundling and Multiple Codeword Transmission and Processing in NR In certain systems, such as NR (e.g., new radio or 5G) systems, data associated with a codeword is mapped to one or more demodulation reference signal (DMRS) ports. DMRS ports may be quasi collocated. Quasi-collocated DMRS ports share a set of quasi collocation (QCL) parameters. In some cases, the set of parameters can be signaled by higher layer signaling, such as radio resource control (RRC) signaling. For example, the set of parameters can be signaled (via RRC signaling) as a QCL-type.

The QCL-type may be associated with a combination (e.g., set) of QCL parameters. In some examples, a QCL-TypeA indicates the DMRS ports are QCL with respect to Doppler shift, Doppler spread, average delay, and delay spread. QCL-TypeB generally indicates the DMRS ports are QCL with respect to Doppler shift, and Doppler spread. QCL-TypeC generally indicates the DMRS ports are QCL with respect to average delay and Doppler shift. QCL-TypeD generally indicates the DMRS ports are QCL with respect to Spatial Rx parameter. Different groups of DMRS ports can share different sets of QCL parameters.

DMRS time domain bundling generally refers to DMRS transmitted across multiple transmission time intervals (TTIs) or scheduling units, such as slots or mini-slots. With DMRS time domain bundling, a receiver can make certain assumptions regarding the "bundled" DMRS transmissions. For example, the receiver may assume that the same precoder is used for the same data channel across slots, mini-slot, or both. DMRS can be configured (e.g., ON) or not configured (e.g., OFF).

In some cases, depending on a device capability, multiple codewords transmission and/or reception may be configured, for example via RRC. Codewords may be mapped to different physical (PHY) transmission layers. The number of layers used in any particular transmission typically depends (at least in part) on Rank Indication (RI) feedback from a UE, which identifies how many layers the UE can discern.

In an illustrative example, a device can be configured to transmit and/or receive one codeword if the device is up to a rank 4 device and configured to transmit and/or receive two codewords if the device is a rank 5 to rank 8 device. The data of each codeword is mapped to a set of DMRS ports. The DMRS ports that carry the data of a codeword may belong to the same QCL group or to different QCL groups.

In the example of two (or more) codewords, the device may send a first (e.g., initial) transmission with the two codewords. Each codeword may be acknowledged separately. In other words, the transmitting device may receive an acknowledgment (ACK) for only one of the codewords (e.g., indicating that codeword was successfully received by the receiving device). In such cases, the transmitting device may only need to retransmit the codeword that was not ACK'd (e.g., and/or for which a NACK was received).

The retransmission may present a challenge for the transmitting device. For example, the transmitting device may need to determine what DMRS port to use for the retransmission. In some cases, the transmitting device may want to change the DMRS port for the retransmission, given the initial transmission was unsuccessful.

Aspects of the present disclosure provide various options for DMRS port mapping when DMRS time domain bundling is ON and when DMRS time domain bundling is OFF in the case of multiple of codeword transmission/reception, and when multiple DMRS port groups are used.

Figure 7:
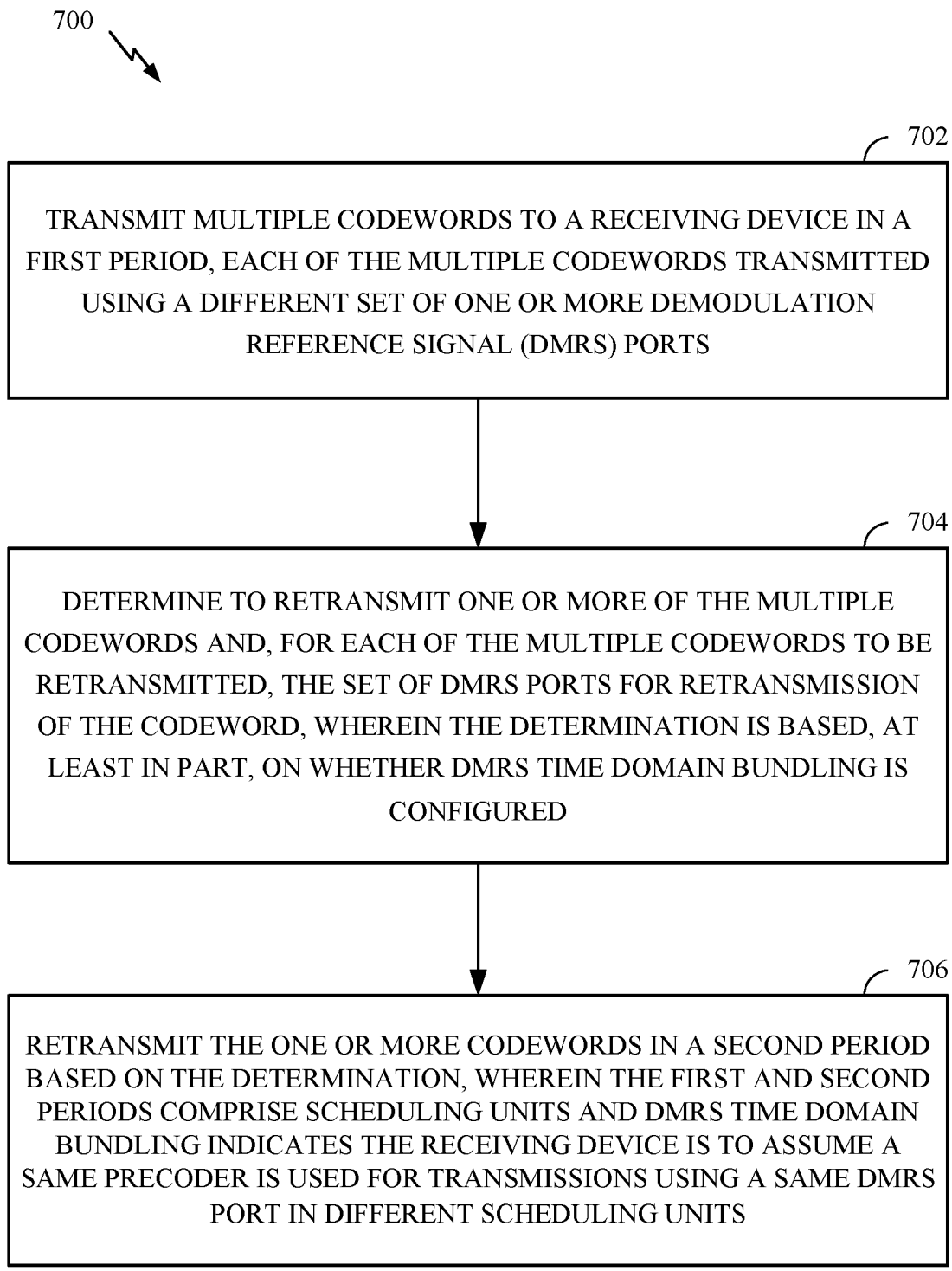
FIG. 7 is a flow diagram illustrating example operations by a transmitting device, in accordance with certain aspects of the present disclosure.

FIG. 7 is a flow diagram illustrating example operations 700 for wireless communications, in accordance with certain aspects of the present disclosure. The operations 700 may be performed by a transmitting device, such as a BS (e.g., a BS 110 in the wireless communication network 100) on the downlink or a UE (e.g., a UE 120 in the wireless communication network 100) on the uplink.

Operations 700 begin, at 702, by transmitting multiple codewords to a receiving device in a first period (e.g., simultaneously), each of the multiple codewords transmitted using a different set of one or more DMRS ports. As noted above, the different sets of DMRS ports may be quasi co-located with respect to a set of QCL parameters (e.g., a Doppler shift, a Doppler spread, average delay, delay spread, and/or a spatial Rx parameter).

At 704, the transmitting device determines to retransmit one or more of the multiple codewords and, for each of the multiple codewords to be retransmitted, the set of DMRS ports for retransmission of the codeword. The determination may be based, at least in part, on whether DMRS time domain bundling is configured. For example, DMRS time-domain bundling may be preconfigured, explicitly indicated (e.g., via RRC), or implicitly indicated. (e.g., by a modulation coding scheme (MCS) or redundancy version (RV) associated with the transmission or retransmission). DMRS time domain bundling generally indicates a same precoder is used for transmissions using a same DMRS port in different scheduling units (e.g., slots, mini-slots, or both).

At 706, the transmitting device retransmits the one or more codewords in a second period based on the determination, wherein the first and second periods comprise scheduling units and DMRS time domain bundling indicates the receiving device is to assume a same precoder is used for transmissions using a same DMRS port in different scheduling units.

Figure 8:
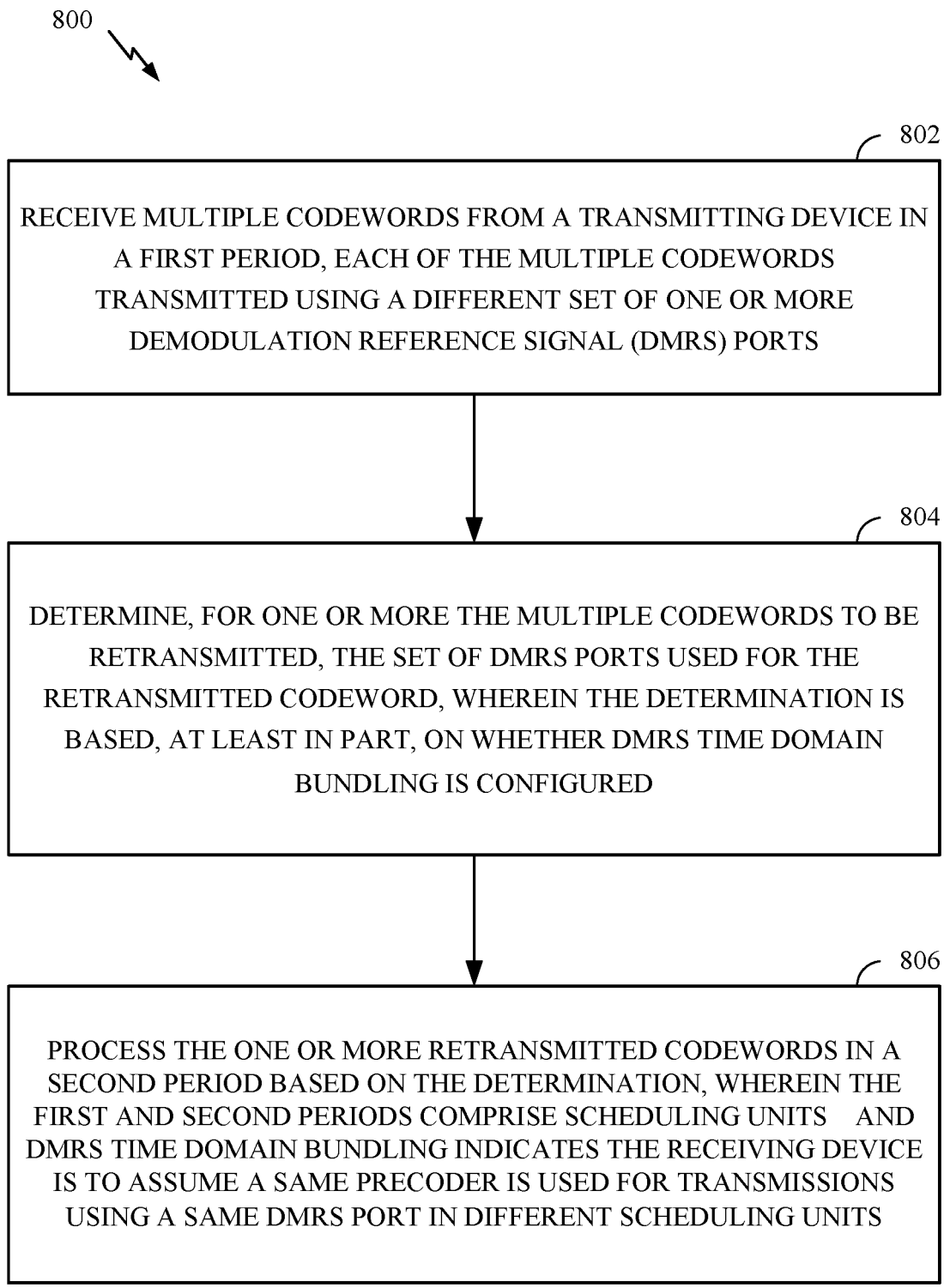
FIG. 8 is a flow diagram illustrating example operations by a receiving device, in accordance with certain aspects of the present disclosure.

FIG. 8 is a flow diagram illustrating example operations 800 for wireless communication, in accordance with certain aspects of the present disclosure. The operations 800 may be performed by a receiving device, such as a BS (e.g., a BS 110 in the wireless communication network 100) on the uplink or a UE (e.g., a UE 120 in the wireless communication network 100) on the downlink. The operations 800 may be complementary operations to the operations 700 performed by the transmitting device.

The operations 800 begin, at 802, by receiving multiple codewords from a transmitting device in a first period, each of the multiple codewords transmitted using a different set of one or more DMRS ports.

At 804, the receiving device determines, for one or more the multiple codewords to be retransmitted, the set of DMRS ports used for the retransmitted codeword. The determination is based, at least in part, on whether DMRS time domain bundling is configured.

At 806, the receiving device processes the one or more retransmitted codewords in a second period based on the determination, wherein the first and second periods comprise scheduling units and DMRS time domain bundling indicates the receiving device is to assume a same precoder is used for transmissions using a same DMRS port in different scheduling units.

According to certain aspects, if DMRS time domain bundling is configured, retransmission of codewords may mapped to any of the DMRS ports, for example, different ports than the port a codeword was initially transmitted on. If DMRS time domain bundling is configured, the transmitting device determines the set of DMRS ports for retransmission of the one or more codewords by selecting any one of the different sets of ports used for transmission of the multiple codewords.

Figure 9:
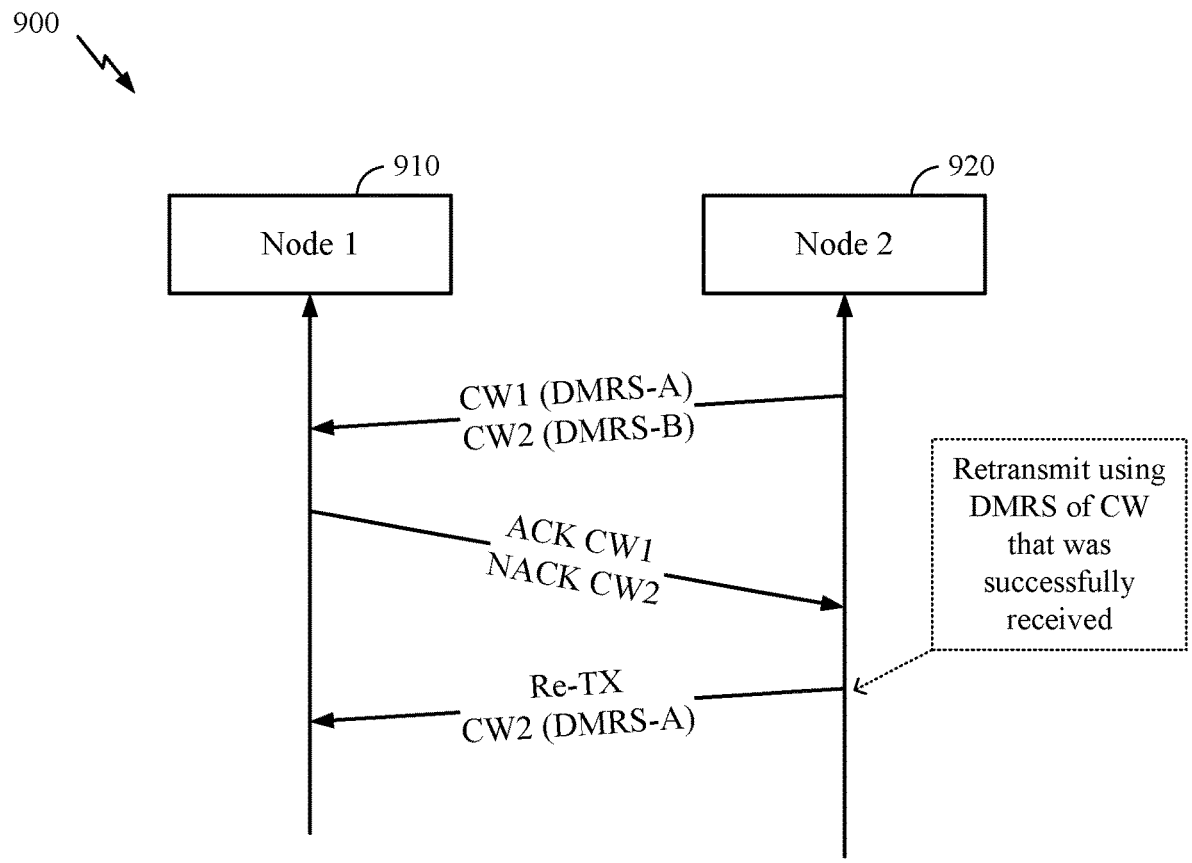
FIG. 9 illustrates an example call flow diagram illustrating codeword retransmission, in accordance with aspects of the present disclosure.

For example, as illustrated in FIG. 9, the transmitting device may select the DMRS ports for retransmission based on which sets of DMRS ports were successful for the transmission of one or more other codewords of the multiple codewords. In the example illustrated in FIG. 9, a transmitting device (Node 2 920) initially transmits two codewords (CW1 and CW2) with a first set of DMRS ports (DMRS-A) used for CW1 and a second set of DMRS ports (DMRS-B) used for CW2. As illustrated, the receiving device (Node 1) successfully receives CW1, but not CW2 and provides ACK/NACK feedback accordingly. For the retransmission of CW2, Node 2 may use DMRS-A, given that CW1 (transmitted with DMRS-A) was successfully received.

In this manner, the transmitter may transmit on the second attempt the codeword that was not ACK'd in the first transmission using the ports that were more successful on the first attempt.

In some cases, DMRS time domain bundling may not configured (e.g., OFF). In such cases, a codeword is retransmitted on the same set of ports as the initial transmission of the codeword. If DMRS time domain bundling is not configured the transmitting device selects, for the determination, for each of the one or more codewords to be retransmitted, the set of DMRS ports used for the transmission of the codeword. In some cases, the set of DMRS ports may be predefined/pre-specified.

In some cases, the different sets of DMRS ports include DMRS ports that are not quasi co-located (QCL'd) and DMRS time domain bundling may still be configured (e.g., ON). For example, the different sets of DMRS ports include a first group of DMRS ports that are quasi co-located with respect to a first set of QCL parameters and at least a second group of DMRS ports that are quasi co-located with respect to a second set of QCL parameters, different than the first set of QCL parameters. In such cases, the determined set of DMRS ports for the retransmitted codewords may include any one of the different sets of ports used for (initial) transmission of the multiple codewords, as in the case of DMRS ports within the same QCL group.

According to certain aspects, a receiving device may assume that a channel estimated based on measurements using DMRS ports in the first group of DMRS ports for the transmission is the same for a channel estimated using the second group of DMRS ports for the transmission. In such cases, the receiving device may jointly consider the channel estimate for the transmission of a codeword using the first group of DMRS ports with a channel estimate for the retransmission of the codeword using the second group of DMRS ports.

In other words, a receiving device may assume that the channel estimated through the ports of the second DMRS port group is the same as the previous channels measured through the first DMRS port group. In an illustrative example, for the DMRS ports {p0, p1} in a QCL group and the DMRS ports {p2, p3} in another QCL group. A codeword transmitted on DMRS port p0 for the first transmission the codeword may be retransmitted on DMRS port p2. In such cases, the receiver can continue the DMRS bundling in the time domain by jointly considering the estimate of the previous p0 port, and the new p2 port for the codeword. In such cases, however, a receiver processing the one or more retransmitted codewords may assume that the retransmission of a codeword using the second group of DMRS ports uses a different precoder than the transmission of the codeword using the first group of DMRS ports (e.g., given the initial transmission was not successful, the transmitter may try a different precoder to help improve the chances the retransmission is successful).

According to certain aspects, the receiving device assumes that the DMRS time domain bundling is restarted when DMRS time domain bundling is configured and DMRS ports for a codeword are in different QCL groups. In an example, again assuming DMRS groups {p0, p1} and {p2, p3}, if the codeword is transmitted using p0 in the first transmission, then retransmitted using p2 in a retransmission (e.g., in a subsequent slot or mini-slot), then the receiving device does not combine the p0 that was transmitted before, and instead assumed that p2 corresponds to a new bundle (e.g., is transmitted with a new precoder). In other words, the receiving device may assume that a channel estimated based on measurements using ports in the first group of DMRS ports for the transmission is not the same for a channel estimated using the second group of DMRS ports for the re transmission.

In some cases, the different sets of DMRS ports include DMRS ports that are not quasi co-located and DMRS time domain bundling is not configured (e.g., OFF). If DMRS bundling is OFF. In such cases, there may be no association of implicit channel derivation across the ports of different port groups.

Figure 10:
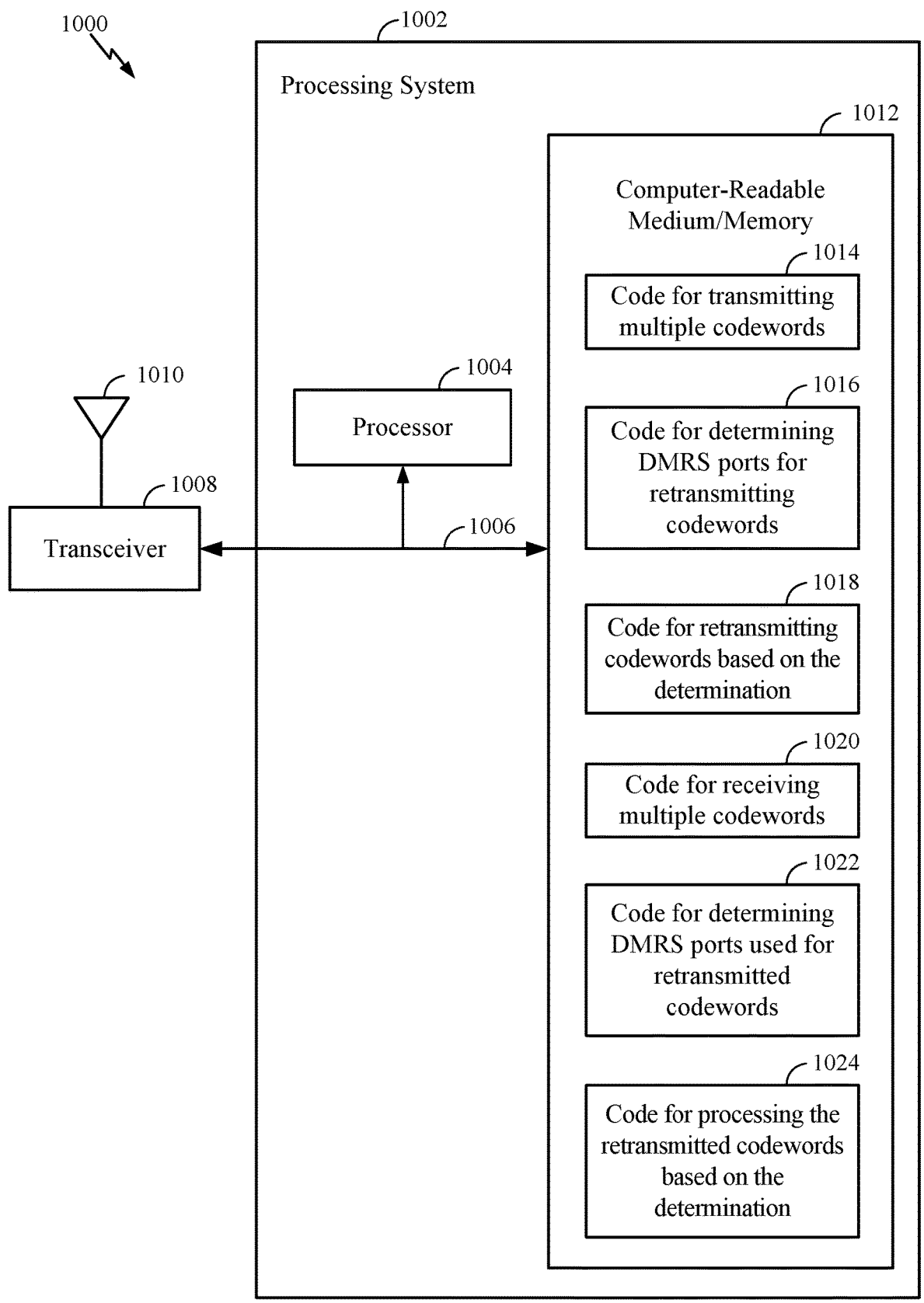
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7 and FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer executable code) that when executed by the processor 1004, cause the processor 1004 to perform the operations illustrated in FIG. 7 and FIG. 8, or other operations for performing the various techniques discussed herein for DMRS time domain bundling and multiple codeword transmission and processing. In certain aspects, computer-readable medium/memory 1012 stores code for transmitting one or more codewords 1014, code for determining codeword to retransmits and DMRS for the retransmitted codewords 1016, code for retransmitting codewords 1018, code for receiving multiple codewords 1020, code for determining the DMRS ports used for the retransmitted codewords 1022, and code for processing the retransmitted codewords based on the determination.

EXAMPLE EMBODIMENTS

Embodiment 1: A method for wireless communications by a receiving device, comprising receiving multiple codewords from a transmitting device in a first period, each of the multiple codewords transmitted using a different set of one or more demodulation reference signal (DMRS) ports, determining, for one or more the multiple codewords to be retransmitted, the set of DMRS ports used for the retransmitted codeword, wherein the determination is based, at least in part, on whether DMRS time domain bundling is configured, and processing the one or more retransmitted codewords in a second period based on the determination, wherein the first and second periods comprise slots or mini-slots and DMRS time domain bundling indicates the receiving device is to assume a same precoder is used for transmissions using a same DMRS port in different slots, mini-slots, or both.

Embodiment 2: The method of Embodiment 1, further comprising determining whether DMRS time domain bundling is configured based on a modulation coding scheme (MCS) associated with the transmission or retransmission, a redundancy version (RV) associated with the transmission or retransmission, or explicit signaling.

Embodiment 3: The method of any of Embodiments 1 or 2, wherein the different sets of DMRS ports comprise DMRS ports that are quasi co-located with respect to a set of quasi co-location parameters and the set of quasi co-location parameters comprises a Doppler shift, a Doppler spread, average delay, delay spread, a spatial Rx parameter, or a combination thereof.

Embodiment 4: The method any of Embodiments 1 to 3, wherein the determined the set of DMRS ports for the retransmitted codewords comprises any one of the different sets of ports used for transmission of the multiple codewords.

Embodiment 5: The method of Embodiment 4, wherein the set of DMRS ports for the retransmitted codewords is based on which codewords were acknowledged as being successfully received.

Embodiment 6: The method of any of Embodiments 1 to 5, wherein, if DMRS time domain bundling is not configured, for each of the one or more codewords to be retransmitted, the determined set of DMRS ports for the retransmitted codewords comprises the set of DMRS ports used for the transmission of the codeword a predefined set of DMRS ports.

Embodiment 7: The method of any of Embodiments 1 to 6, wherein the different sets of DMRS ports comprise a first group of DMRS ports that are quasi co-located with respect to a first set of quasi co-location parameters and at least a second group of DMRS ports that are quasi co-located with respect to a second set of quasi co-location parameters, different than the first set of quasi co-location parameters.

Embodiment 8: The method of Embodiment 7, wherein the determined set of DMRS ports for the retransmitted codewords is from a same group of DMRS of ports used for transmission of the multiple codewords.

Embodiment 9: The method of Embodiment 7, wherein processing the one or more retransmitted codewords comprises jointly considering a channel estimate for the transmission of a codeword using the first group of DMRS ports with a channel estimate for the retransmission of the codeword using the second group of DMRS ports.

Embodiment 10: The method of Embodiment 7, wherein processing the one or more retransmitted codewords comprises assuming that the retransmission of a codeword using the second group of DMRS ports uses a different precoder than the transmission of the codeword using the first group of DMRS ports.

Embodiment 11: method of Embodiment 7, wherein DMRS time domain bundling is not configured processing the one or more retransmitted codewords comprises not assuming that a channel estimated based on measurements using ports in the first group of DMRS ports for the transmission is the same for a channel estimated using the second group of DMRS ports for the transmission.

Embodiment 12: A method for wireless communications by a transmitting device, comprising transmitting multiple codewords to a receiving device in a first period, each of the multiple codewords transmitted using a different set of one or more demodulation reference signal (DMRS) ports, determining to retransmit one or more of the multiple codewords and, for each of the multiple codewords to be retransmitted, the set of DMRS ports for retransmission of the codeword, wherein the determination is based, at least in part, on whether DMRS time domain bundling is configured, and retransmitting the one or more codewords in a second period based on the determination, wherein the first and second periods comprise slots or mini-slots and DMRS time domain bundling indicates the receiving device is to assume a same precoder is used for transmissions using a same DMRS port in different slots, mini-slots, or both.

Embodiment 13: The method of Embodiment 12, further comprising providing an indication of whether DMRS time domain bundling is configured based on a modulation coding scheme (MCS) associated with the transmission or retransmission, a redundancy version (RV) associated with the transmission or retransmission, or explicit signaling.

Embodiment 14: The method of any of Embodiments 12 to 13, wherein the different sets of DMRS ports comprise DMRS ports that are quasi co-located with respect to a set of quasi co-location parameters and the set of quasi co-location parameters comprises a Doppler shift, a Doppler spread, average delay, delay spread, or a spatial Rx parameter, or a combination thereof.

Embodiment 15: The method of any of Embodiments 12 to 14, wherein the determination of the set of DMRS ports for retransmission of the one or more codewords comprises selecting any one of the different sets of ports used for transmission of the multiple codewords.

Embodiment 16: The method of Embodiment 15, wherein the selection is based on which codewords were acknowledged as being successfully received.

Embodiment 17: The method of any of Embodiments 12 to 16, wherein, if DMRS time domain bundling is not configured, for each of the one or more codewords to be retransmitted, the determination of the set of DMRS ports for the retransmission comprises selecting the set of DMRS ports used for the transmission of the codeword or selecting from a predefined set of DMRS ports.

Embodiment 18: The method of any of Embodiments 12 to 17, wherein the different sets of DMRS ports comprise a first group of DMRS ports that are quasi co-located with respect to a first set of quasi co-location parameters and at least a second group of DMRS ports that are quasi co-located with respect to a second set of quasi co-location parameters, different than the first set of quasi co-location parameters.

Embodiment 19: The method of Embodiment 18, wherein the determined set of DMRS ports for the retransmitted codewords is from a same group of DMRS of ports used for transmission of the multiple codewords.

Embodiment 20: An apparatus for wireless communications, comprising means for receiving multiple codewords from a transmitting device in a first period, each of the multiple codewords transmitted using a different set of one or more demodulation reference signal (DMRS) ports means for determining, for one or more the multiple codewords to be retransmitted, the set of DMRS ports used for the retransmitted codeword, wherein the determination is based, at least in part, on whether DMRS time domain bundling is configured and means for processing the one or more retransmitted codewords in a second period based on the determination.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a receiving device, comprising:
   receiving multiple codewords from a transmitting device in a first period, wherein each codeword of the multiple codewords is transmitted using a different set of one or more demodulation reference signal (DMRS) ports of a plurality of different sets of DMRS ports;
   determining, for one or more retransmitted codewords of the multiple codewords, a set of DMRS ports used for the one or more retransmitted codewords, wherein the determination is based, at least in part, on whether DMRS time domain bundling is configured; and
   processing the one or more retransmitted codewords in a second period based on the determination, wherein:
      the first and second periods comprise different scheduling units; and
      when the DMRS time domain bundling is configured, the DMRS time domain bundling indicates the receiving device is to assume a same precoder is used for the multiple codewords and the one or more retransmitted codewords that use a same DMRS port in the different scheduling units.

2. The method of claim 1, further comprising determining whether the DMRS time domain bundling is configured based on:
   a modulation coding scheme (MCS) associated with the multiple codewords or the one or more retransmitted codewords;
   a redundancy version (RV) associated with the multiple codewords or the one or more retransmitted codewords; or
   explicit signaling.

3. The method of claim 1, wherein:
   the plurality of different sets of DMRS ports comprise DMRS ports that are quasi co-located with respect to a set of quasi co-location parameters; and
   the set of quasi co-location parameters comprises a Doppler shift, a Doppler spread, average delay, delay spread, a spatial receive (Rx) parameter, or a combination thereof.

4. The method of claim 1, wherein:
   the determined set of DMRS ports for the retransmitted codewords comprises any one of the plurality of different sets of ports used for transmission of the multiple codewords.

5. The method of claim 4, wherein the determined set of DMRS ports for the retransmitted codewords is based on which codewords of the multiple codewords were acknowledged as being successfully received.

6. The method of claim 1, wherein, when the DMRS time domain bundling is not configured, the determined set of DMRS ports for at least a first retransmitted codeword of the one or more retransmitted codewords comprises:
   the different set of DMRS ports used for transmission of at least a first codeword of the multiple codewords; or
   a predefined set of DMRS ports.

7. The method of claim 1, wherein the plurality of different sets of DMRS ports comprise:
   a first group of DMRS ports that are quasi co-located with respect to a first set of quasi co-location parameters; and
   at least a second group of DMRS ports that are quasi co-located with respect to a second set of quasi co-location parameters, different than the first set of quasi co-location parameters.

8. The method of claim 7, wherein:
   the determined set of DMRS ports for the one or more retransmitted codewords is from a same group of DMRS of ports used for transmission of the multiple codewords.

9. The method of claim 7, wherein processing the one or more retransmitted codewords comprises:
   jointly considering a channel estimate for transmission of a codeword of the multiple codewords using the first group of DMRS ports with a channel estimate for retransmission of the codeword of the one or more retransmitted codewords using the second group of DMRS ports.

10. The method of claim 7, wherein processing the one or more retransmitted codewords comprises assuming that the retransmission of a codeword using the second group of DMRS ports uses a different precoder than the transmission of the codeword using the first group of DMRS ports.

11. The method of claim 7, wherein when DMRS time domain bundling is not configured:
    processing the one or more retransmitted codewords comprises assuming that a channel estimated based on measurements using DMRS ports in the first group of DMRS ports for transmission of a codeword is not the same for a channel estimated using the second group of DMRS ports for retransmission of the codeword.

12. A method for wireless communications by a transmitting device, comprising:
    transmitting multiple codewords to a receiving device in a first period, wherein each codeword of the multiple codewords is transmitted using a different set of one or more demodulation reference signal (DMRS) ports of a plurality of different sets of DMRS ports;
    determining:
       to retransmit one or more codewords of the multiple codewords; and
       for each codeword of the one or more retransmitted codewords, a set of DMRS ports for retransmission of the codeword, wherein the determination is based, at least in part, on whether DMRS time domain bundling is configured; and
    retransmitting the one or more codewords in a second period based on the determination, wherein:
       the first and second periods comprise different scheduling units; and
       when the DMRS time domain bundling is configured, the DMRS time domain bundling indicates the receiving device is to assume a same precoder is used for the multiple codewords and the one or more retransmitted codewords that use a same DMRS port in the different scheduling units.

13. The method of claim 12, further comprising providing an indication of whether the DMRS time domain bundling is configured based on:
    a modulation coding scheme (MCS) associated with the multiple codewords or the one or more retransmitted codewords;

a redundancy version (RV) associated with the multiple codewords or the one or more retransmitted codewords; or explicit signaling.

14. The method of claim 12, wherein:

the plurality of different sets of DMRS ports comprise DMRS ports that are quasi co-located with respect to a set of quasi co-location parameters; and the set of quasi co-location parameters comprises a Doppler shift, a Doppler spread, average delay, delay spread, or a spatial receive (Rx) parameter, or a combination thereof.

15. The method of claim 12, wherein:

determining the set of DMRS ports for retransmission of the one or more codewords comprises selecting any one of the plurality of different sets of ports used for transmission of the multiple codewords.

16. The method of claim 15, wherein the selection is based on which codewords of the multiple codewords were acknowledged as being successfully received.

17. The method of claim 12, wherein, when the DMRS time domain bundling is not configured, determining the set of DMRS ports for at least a first retransmitted codeword of one or more retransmitted codewords comprises:

selecting different set of DMRS ports used for transmission of at least a first codeword of the multiple codewords; or selecting from a predefined set of DMRS ports.

18. The method of claim 12, wherein the plurality of different sets of DMRS ports comprise:

a first group of DMRS ports that are quasi co-located with respect to a first set of quasi co-location parameters; and at least a second group of DMRS ports that are quasi co-located with respect to a second set of quasi co-location parameters, different than the first set of quasi co-location parameters.

19. The method of claim 18, wherein:

the determined set of DMRS ports for the one or more retransmitted codewords is from a same group of DMRS of ports used for transmission of the multiple codewords.

20. An apparatus for wireless communications, comprising:

means for receiving multiple codewords from a transmitting device in a first period, wherein each codeword of the multiple codewords is transmitted using a different set of one or more demodulation reference signal (DMRS) ports of a plurality of different sets of DMRS ports;

means for determining, for one or more retransmitted codewords of the multiple codewords, a set of DMRS ports used for the one or more retransmitted codewords, wherein the determination is based, at least in part, on whether DMRS time domain bundling is configured; and processing the one or more retransmitted codewords in a second period based on the determination, wherein:

the first and second periods comprise different scheduling units; and when the DMRS time bundling is configured, the DMRS time domain bundling indicates the apparatus is to assume a same precoder is used for the multiple codewords and the one or more retransmitted codewords that use a same DMRS port in the different scheduling units.

* * * * *